Sept. 16, 1947. E. MEIER 2,427,614
ROTOR FOR MULTISTAGE TURBO-MACHINES
Filed Jan. 17, 1944

Inventor
Ernst Meier
By
Attorneys

UNITED STATES PATENT OFFICE 2,427,614

ROTOR FOR MULTISTAGE TURBO-MACHINES

Ernst Meier, Zurich, Switzerland, assignor to Aktiengesellschaft Fuer Technische Studien, Zurich, Switzerland, a corporation of Switzerland Application January 17, 1944, Serial No. 518,617
In Switzerland February 9, 1943

3 Claims. (Cl. 253—39)

This invention relates to a rotor for multistage turbo-machines, particularly steam and gas turbines, comprising a number of disc-shaped elements connected to one another axially by means of bolts.

It is known that rotors of this kind offer the advantage that each element can be forged separately, so that a homogenous structure without any holes or porous parts is obtained. On the other hand such rotors have the drawback that the bolts employed for joining the various disc-shaped elements have to take up the whole turning moment. If moreover such a rotor is also subject to bending stresses in the proximity of the longitudinal axis, then the bolts are, in addition, subjected alternately to tension and pressure stresses during each rotation, as a consequence of which the strain exerted thereon is very great.

In order to overcome this drawback in a rotor for multistage turbo-machines according to the present invention, the lateral surfaces of the turned, disc-shaped elements coming in contact with each other have identical, radial teeth cut therein, the wedge-shaped surfaces of which intermesh. The disc-shaped elements are centered with the aid of these teeth and the turning moment is for the greater part also transmitted by them, so that the bolts have only to hold said elements together in the axial direction of the rotor. If the disc-shaped elements are provided with a reinforced external rim serving to support blades, the teeth referred to above are preferably arranged as near as possible to such an external rim of the elements. Furthermore, the bolts may conveniently be passed through said teeth and a certain clearance be provided around them so that the disc-shaped elements can expand independently from one another.

Two preferred embodiments of the invention are illustrated by way of example in the accompanying drawing, in which.

Figure 3:
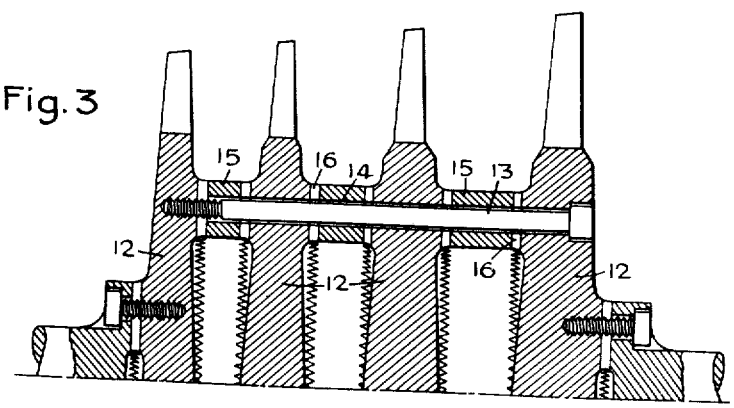

Fig. 3 a part of an axial, longitudinal section through a second embodiment of a rotor for axial flow.

Figure 1:
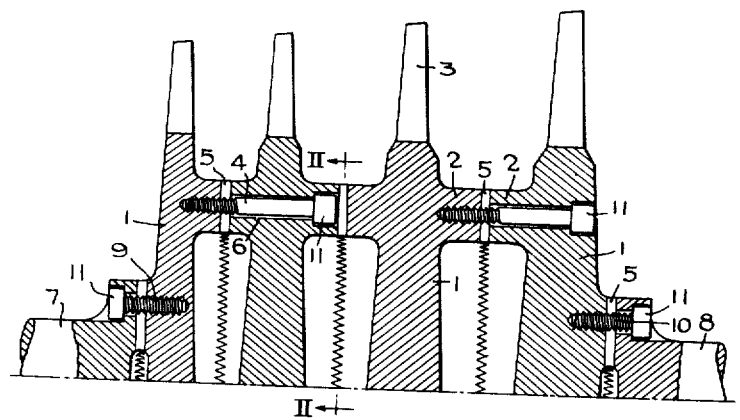
Fig. 1 shows an axial, longitudinal section through part of a rotor for an axial flow turbine and having two free shaft ends.
Figure 2:
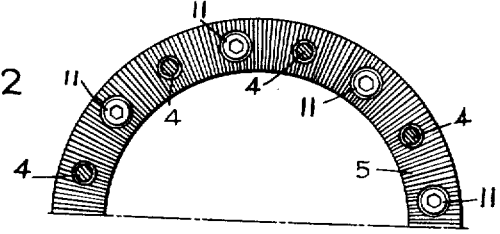
Fig. 2 is a section on the line II—II of Fig. 1.

Referring to Figs. 1 and 2, numeral 1 denotes turned bodies without center bores and designed as discs. These discs 1 have a reinforced external rim 2 which serves for fixing blades 3 of the axial flow type. The discs 1 are held together in pairs by a number of bolts 4 distributed over their periphery. The groups of bolts 4, each of which holds together a pair of discs 1, are circumferentially offset, each group with respect to the group or groups next to it. The amount of offset is one half the arcuate interval between bolts as shown in Fig. 2, where the heads and shanks of the bolts clearly differentiate the two groups of bolts at the plane of section. The lateral surfaces of the discs 1 coming in contact with one another are arranged as near as possible to the external rim 2 and are provided with identical, radial teeth 5 having intermeshing wedge-shaped surfaces. The bolts 4 pass through these teeth 5. The latter effect the centering of the discs 1, and the turning moment is also transmitted for the greater part by said teeth 5, so that the bolts 4 have only to hold the discs 1 together in the axial direction. It is advisable to impart a certain shrinkage stress to the bolts 4, so that they are permanently under a tensile stress.

The part of the relatively thin bolts 4 which does not engage in a counter-thread, is surrounded by a clearance 6, so that the discs 1 can expand independently from one another. Thus the possibility exists of manufacturing the various rotor discs 1 of different materials having different coefficients of expansion. This is important for example in the case of gas turbines, since in this way it is only necessary to manufacture those parts of the rotor which are subject to the highest temperatures of heat resisting and therefore expensive materials.

The free shaft ends 7 and 8, which serve for supporting in a known manner the rotor herein described, are connected by bolts 9 and 10 respectively to the adjacent discs 1. The lateral surfaces of the discs 1 and free shaft ends 7, 8 coming in contact with one another are likewise provided with identical, radial teeth having intermeshing wedge-shaped surfaces.

An axial flow rotor is always subject to thrust in an axial direction. It is practicable and desirable so to locate the thrust bearing that the disc-shaped elements are forced against one another by the axial thrust and as a consequence the bolts 4, 9 and 10 are relieved, at least in part, from the axial stress.

The heads 11 of the various bolts 4, 9 and 10 are countersunk so that they offer no obstacle to the cutting of the teeth 5 and also do not cause any additional windage losses due to eddies. The latter applies also to the bolts 4, 9 and 10 themselves, which are located entirely inside the discs 1 and the free shaft ends 7, 8 respectively.

In the embodiment illustrated in Fig. 3 the turned elements, designed as discs 12, are held together by means of bolts 13 acting as stay bolts and extending through all discs 1 from one end of the rotor to the other end. The part of these bolts 13 which does not engage in a counter thread is, in this case also, surrounded by a clearance 14 provided between said part and annular shaped intermediate pieces 15 inserted between each pair of discs 12. The end surfaces of these annular pieces 15 contact the adjacent surfaces of the discs 12. The surfaces of the discs 12 and annular pieces 15 which come into contact with one another are provided with identical, radial teeth 16 having intermeshing, wedge-shaped surfaces. In this case also, the teeth 16 effect centering of the discs 12 and serve at the same time for transmitting the greater part of the turning moment.

The annular pieces 15 can be manufactured of a material differing from that employed for the discs 12, whereby the latter two need not all be of the same material. If one of the annular pieces 15 should for any reason be damaged, it can be replaced separately, without further parts of the rotor or the whole rotor itself having to be replaced.

The invention can also be applied in a similar manner in the case of axial flow blowers and axial flow pumps. It can likewise be applied if, for example, only the high-pressure section of a turbine has to be manufactured in the manner herein described, whilst in the corresponding low-pressure section the runner discs are made in the usual manner in one piece with the shaft or fixed as separate members thereto. If, in such a case, the high-pressure and low-pressure sections are to be accommodated within a common casing, then the low-pressure section must by means of bolts, welding or the like, be joined in a manner preventing angular displacement to the high-pressure section comprising a number of disc-shaped elements without center bores and connected to one another in the axial direction by means of bolts.

What is claimed is:

1. A rotor for turbo-machines intended for inter-position between axially alined end shafts, comprising in combination a plurality of peripherally bladed discs devoid of central shaft openings; and means serving to connect said discs in a rigid unit, comprising means affording annular series of intermeshing radially extending teeth between successive discs, said teeth affording the sole area of engagement between said discs, and each having inclined plane engaging surfaces which are oblique to the axis of the rotor, and a plurality of connectors parallel with the axis of the rotor and arranged in circular series around said axis, said connectors reacting in tension to hold the discs together, and being protected by clearance against assumption of loads in shear, whereby the teeth maintain concentricity and alinement of the discs and absorb all torque stresses and the discs may expand and contract differentially without interference by the connectors.

2. The combination defined in claim 1 in which there are more than two discs and the connectors engage the end discs of the series and pass through the intermediate discs but do not enter into contact therewith.

3. The combination defined in claim 1 in which the teeth are formed on rims closely adjacent the roots of the peripheral blades and inner-disc engagement occurs solely in the toothed area.

ERNST MEIER.

REFERENCES CITED

The following references are of record in the file of this patent:

UNITED STATES PATENTS

| Number | Name | Date |
|---|---|---|
| 1,118,361 | Lasche | Nov. 24, 1914 |
| 1,209,918 | Westinghouse | Dec. 26, 1916 |
| 1,566,861 | Halliwell | Dec. 22, 1925 |
| 2,303,031 | Dusevoir | Nov. 24, 1942 |

FOREIGN PATENTS

| Number | Country | Date |
|---|---|---|
| 402,525 | Germany | Sept. 20, 1924 |
| 74,422 | Austria | July 10, 1918 |
| 492,252 | Germany | Feb. 20, 1930 |
| 440,816 | Germany | Feb. 16, 1927 |
| 703,133 | France | Feb. 2, 1931 |
| 394,001 | Great Britain | June 19, 1933 |

---

Certificate of Correction

Patent No. 2,427,614. September 16, 1947.

ERNST MEIER

It is hereby certified that error appears in the printed specification of the above numbered patent requiring correction as follows: Column 4, line 25, claim 3, for "inner-disc" read *inter-disc*; and that the said Letters Patent should be read with this correction therein that the same may conform to the record of the case in the Patent Office.

Signed and sealed this 25th day of November, A. D. 1947.

[SEAL]

THOMAS F. MURPHY,
*Assistant Commissioner of Patents.*

In the embodiment illustrated in Fig. 3 the turned elements, designed as discs 12, are held together by means of bolts 13 acting as stay bolts and extending through all discs 1 from one end of the rotor to the other end. The part of these bolts 13 which does not engage in a counter thread is, in this case also, surrounded by a clearance 14 provided between said part and annular shaped intermediate pieces 15 inserted between each pair of discs 12. The end surfaces of these annular pieces 15 contact the adjacent surfaces of the discs 12. The surfaces of the discs 12 and annular pieces 15 which come into contact with one another are provided with identical, radial teeth 16 having intermeshing, wedge-shaped surfaces. In this case also, the teeth 16 effect centering of the discs 12 and serve at the same time for transmitting the greater part of the turning moment.

The annular pieces 15 can be manufactured of a material differing from that employed for the discs 12, whereby the latter two need not all be of the same material. If one of the annular pieces 15 should for any reason be damaged, it can be replaced separately, without further parts of the rotor or the whole rotor itself having to be replaced.

The invention can also be applied in a similar manner in the case of axial flow blowers and axial flow pumps. It can likewise be applied if, for example, only the high-pressure section of a turbine has to be manufactured in the manner herein described, whilst in the corresponding low-pressure section the runner discs are made in the usual manner in one piece with the shaft or fixed as separate members thereto. If, in such a case, the high-pressure and low-pressure sections are to be accommodated within a common casing, then the low-pressure section must by means of bolts, welding or the like, be joined in a manner preventing angular displacement to the high-pressure section comprising a number of disc-shaped elements without center bores and connected to one another in the axial direction by means of bolts.

What is claimed is:

1. A rotor for turbo-machines intended for inter-position between axially alined end shafts, comprising in combination a plurality of peripherally bladed discs devoid of central shaft openings; and means serving to connect said discs in a rigid unit, comprising means affording annular series of intermeshing radially extending teeth between successive discs, said teeth affording the sole area of engagement between said discs, and each having inclined plane engaging surfaces which are oblique to the axis of the rotor, and a plurality of connectors parallel with the axis of the rotor and arranged in circular series around said axis, said connectors reacting in tension to hold the discs together, and being protected by clearance against assumption of loads in shear, whereby the teeth maintain concentricity and alinement of the discs and absorb all torque stresses and the discs may expand and contract differentially without interference by the connectors.

2. The combination defined in claim 1 in which there are more than two discs and the connectors engage the end discs of the series and pass through the intermediate discs but do not enter into contact therewith.

3. The combination defined in claim 1 in which the teeth are formed on rims closely adjacent the roots of the peripheral blades and inner-disc engagement occurs solely in the toothed area.

ERNST MEIER.

REFERENCES CITED

The following references are of record in the file of this patent:

UNITED STATES PATENTS

| Number | Name | Date |
| --- | --- | --- |
| 1,118,361 | Lasche | Nov. 24, 1914 |
| 1,209,918 | Westinghouse | Dec. 26, 1916 |
| 1,566,861 | Halliwell | Dec. 22, 1925 |
| 2,303,031 | Dusevoir | Nov. 24, 1942 |

FOREIGN PATENTS

| Number | Country | Date |
| --- | --- | --- |
| 402,525 | Germany | Sept. 20, 1924 |
| 74,422 | Austria | July 10, 1918 |
| 492,252 | Germany | Feb. 20, 1930 |
| 440,816 | Germany | Feb. 16, 1927 |
| 703,133 | France | Feb. 2, 1931 |
| 394,001 | Great Britain | June 19, 1933 |

---

Certificate of Correction

Patent No. 2,427,614.

September 16, 1947.

ERNST MEIER

It is hereby certified that error appears in the printed specification of the above numbered patent requiring correction as follows: Column 4, line 25, claim 3, for "inner-disc" read *inter-disc*; and that the said Letters Patent should be read with this correction therein that the same may conform to the record of the case in the Patent Office.

Signed and sealed this 25th day of November, A. D. 1947.

[SEAL]

THOMAS F. MURPHY,
*Assistant Commissioner of Patents.*